US009777627B2

(12) United States Patent
Snyder

(10) Patent No.: US 9,777,627 B2
(45) Date of Patent: Oct. 3, 2017

(54) ENGINE AND COMBUSTION SYSTEM

(75) Inventor: Philip H. Snyder, Avon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 570 days.

(21) Appl. No.: 13/340,249

(22) Filed: Dec. 29, 2011

(65) Prior Publication Data

US 2012/0216503 A1 Aug. 30, 2012

Related U.S. Application Data

(60) Provisional application No. 61/428,731, filed on Dec. 30, 2010.

(51) Int. Cl.
*F02C 3/02* (2006.01)
*F23R 7/00* (2006.01)
*F23R 3/56* (2006.01)

(52) U.S. Cl.
CPC .................. *F02C 3/02* (2013.01); *F23R 3/56* (2013.01); *F23R 7/00* (2013.01)

(58) Field of Classification Search
CPC ...... F02C 5/04; F02C 5/10; F02C 5/12; F02C 3/16; F02C 3/165; F02C 3/02; F23R 3/56; F23R 7/00
USPC .......................... 60/39.34, 247, 39.38, 39.76
See application file for complete search history.

(56) References Cited

U.S. PATENT DOCUMENTS

| | | | | |
|---|---|---|---|---|
| 2,695,053 | A * | 11/1954 | Durr et al. | 60/39.77 |
| 2,942,412 | A * | 6/1960 | Bollay | 60/39.77 |
| 3,417,564 | A * | 12/1968 | Call | 60/39.34 |
| 4,642,046 | A * | 2/1987 | Saito et al. | 60/39.76 |
| 5,145,354 | A * | 9/1992 | Palm, Jr. | 431/1 |
| 5,197,276 | A * | 3/1993 | Keller | 60/39.45 |
| 5,513,489 | A | 5/1996 | Bussing | |
| 5,894,719 | A | 4/1999 | Nalim et al. | |
| 6,449,939 | B1 | 9/2002 | Snyder | |
| 6,460,342 | B1 | 10/2002 | Nalim | |
| 6,526,936 | B2 | 3/2003 | Nalim | |
| 6,845,620 | B2 | 1/2005 | Nalim | |
| 7,137,243 | B2 | 11/2006 | Snyder et al. | |
| 8,443,583 | B2 * | 5/2013 | Nalim et al. | 60/39.34 |

(Continued)

FOREIGN PATENT DOCUMENTS

| | | | |
|---|---|---|---|
| EP | 1710425 A1 | | 10/2006 |
| WO | 0068566 A2 | | 11/2000 |
| WO | WO 2008/070210 A2 | * | 6/2008 |

OTHER PUBLICATIONS

International Search Report & Written Opinion, PCT/US2011/067904, Rolls-Royce North American Technologies, Inc., dated Apr. 17, 2012.

(Continued)

*Primary Examiner* — Ted Kim
(74) *Attorney, Agent, or Firm* — Barnes & Thornburg LLP

(57) ABSTRACT

One embodiment of the present invention is a unique engine. Another embodiment of the present invention is a unique combustion system. Other embodiments include apparatuses, systems, devices, hardware, methods, and combinations for engines and combustion systems. Further embodiments, forms, features, aspects, benefits, and advantages of the present application will become apparent from the description and figures provided herewith.

8 Claims, 2 Drawing Sheets

(56) References Cited

U.S. PATENT DOCUMENTS

| | | | | |
|---|---|---|---|---|
| 2001/0015058 | A1 | 8/2001 | Snyder | |
| 2006/0213201 | A1* | 9/2006 | Lupkes et al. | 60/39.76 |
| 2006/0254254 | A1 | 11/2006 | Saddoughi et al. | |
| 2007/0157625 | A1 | 7/2007 | Snyder et al. | |
| 2010/0018215 | A1 | 1/2010 | Razi et al. | |

OTHER PUBLICATIONS

European Office Action issued in connection with European Application No. 11852324.0-1607. dated May 9, 2017, 5 pages.

Japanese Office Action, Japanese Patent Application No. 2012-547675 dated Jan. 25, 2016, 6 pages.

Extended European search report in corresponding EP application (i.e., EP 11 85 2324), dated Apr. 2, 2015 (8 pages).

M. Razi Nalim, "Longitudinally Stratified Combustion in Wave Rotors", Journal of Propulsion and Power; Nov.-Dec. 2000; pp. 1060-1068; vol. 16, No. 6; American Institute of Aeronautics and Astronautics, Inc. USA (9 pages).

* cited by examiner

ENGINE AND COMBUSTION SYSTEM

CROSS REFERENCE TO RELATED APPLICATIONS

The present application claims benefit of U.S. Provisional Patent Application No. 61/428,731, filed Dec. 30, 2010, entitled ENGINE AND COMBUSTION SYSTEM, which is incorporated herein by reference.

FIELD OF THE INVENTION

The present invention relates to engines, including but not limited to gas turbine engines, pulse combustion engines and pressure gain combustors, and more particularly, to wave rotor combustors utilizing either detonative or deflagrative combustion employed in engines or as engines.

BACKGROUND

Engines and combustion systems for engines remain an area of interest. Some existing systems have various shortcomings, drawbacks, and disadvantages relative to certain applications. Accordingly, there remains a need for further contributions in this area of technology.

SUMMARY

One embodiment of the present invention is a unique engine. Another embodiment of the present invention is a unique combustion system. Other embodiments include apparatuses, systems, devices, hardware, methods, and combinations for engines and combustion systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
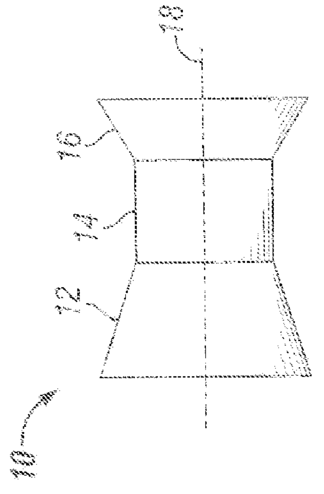
FIG. 1 schematically depicts some aspects of a non-limiting example of an engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of an engine 10 in accordance with an embodiment of the present invention are schematically depicted. In one form, engine 10 is a gas turbine engine. Engine 10 includes a compressor system 12, a combustion system 14 in fluid communication with compressor system 12, and a turbine system 16 in fluid communication with combustion system 14. In one form, compressor system 12, combustion system 14 and turbine system 16 are disposed about an engine centerline 18, e.g., the axis of rotation of compressor 12 and turbine 16. In other embodiments, other arrangements may be employed. In various embodiments, engine 10 may or may not have a compressor system and/or a turbine system, or may have additional turbomachinery components in addition to a compressor system and/or a turbine system. In some embodiments, engine 10 may be a direct propulsion engine that produces thrust directly from combustion system 14. In other embodiments, combustion system 14 may form a gas generator for a gas turbine propulsion system, or may be employed in a gas turbine engine topping cycle. In still other embodiments, engine 10 may be one or more of other types of engines that employ combustion systems, such as combustion system 14.

Figure 2A:
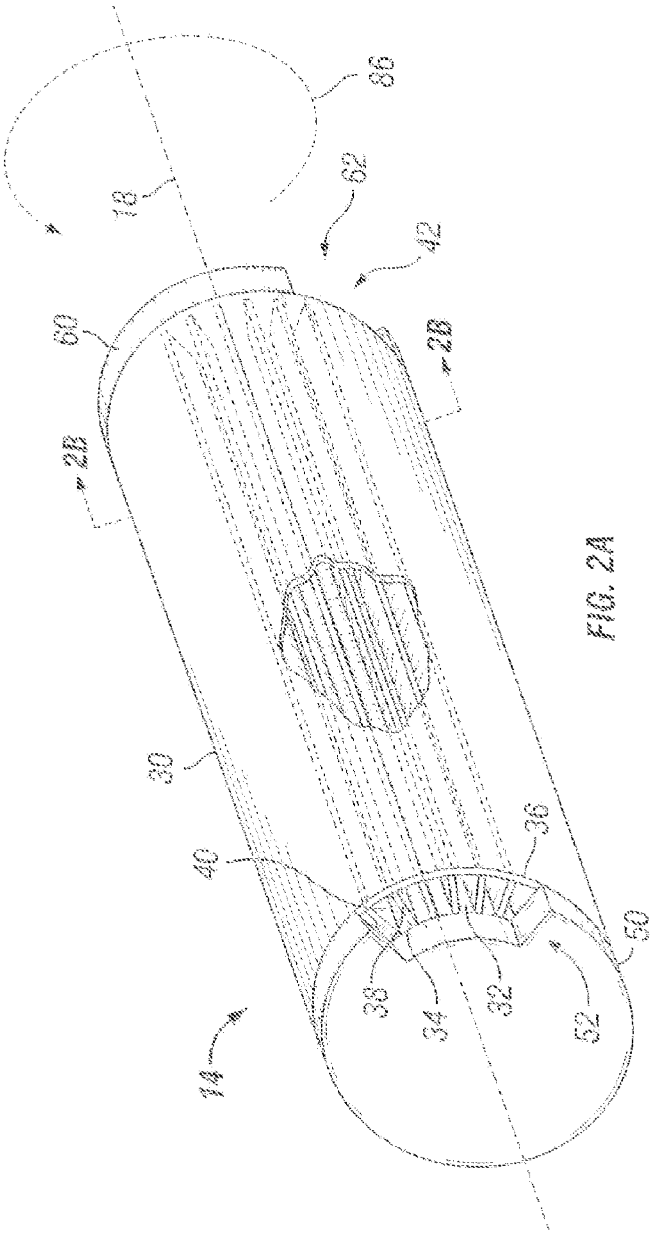
FIGS. 2A and 2B schematically depict some aspects of a non-limiting example of a combustion system in accordance with an embodiment of the present invention.
Figure 2B:
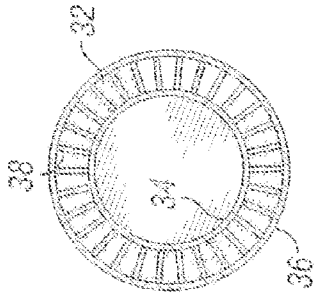

Referring to FIGS. 2A and 2B, in one form, combustion system 14 is a wave rotor system having a wave rotor 30, an end structure 50 and an end structure 60. Wave rotor 30 includes a plurality of circumferentially spaced combustion channels 32. In one form, combustion channels 32 are formed by a cylindrical inner wall 34, a cylindrical outer wall 36, and a plurality of partition walls 38. Partition walls 38 partition the annulus formed by inner wall 34 and outer wall 36 into the plurality of combustion channels 32. In other embodiments, combustion channels 32 may take other forms, may be formed by other features, and/or may have contiguous, spaced-apart and/or staggered relationships relative to each other. In one form, combustion channels 32 are approximately rectangular in cross-sectional shape, and are oriented longitudinally in an axial direction parallel to engine centerline 18. In other embodiments, combustion channels 32 may be of any shape, oriented in any one or more directions, including radial, axial and circumferential directions, or combinations thereof, other two or three dimensionally curved channels or any other shape suited to the particular application.

Each combustion channel 32 includes an open end 40 and an open end 42, and extends therebetween. Combustion channels 32 are configured to contain a combustion process. The combustion process may be deflagration combustion and/or detonation combustion. In various embodiments, combustion channels 32 may include flame accelerators (not shown) or other devices. The flame accelerators may be configured to accelerate a combustion flame front sufficient to yield a deflagration to detonation transition (DDT). Or, the flame accelerators may be configured to accelerate a deflagration combustion process without transitioning to a detonation combustion process. In some embodiments, the flame accelerators may be configured to accelerate a deflagration combustion flame front without achieving DDT at some operating conditions, while achieving DDT at other operating conditions.

Although embodiments are described herein as with respect to a wave rotor combustion system, it will be understood that other embodiments may take other forms. For example, in some embodiments, combustion system 14 may be a rotary valve combustion system, wherein combustion channels 32 are part of stationary combustor, e.g., a combustor similar in configuration to wave rotor 30, but non-rotating, wherein end structures 50 and 60 are rotary valves that rotate relative to the combustion channels 32. In other embodiments, wave rotor 30 and end structures 50 and 60 may each rotate, e.g., at different speeds and/or in different directions.

Figure 3A:
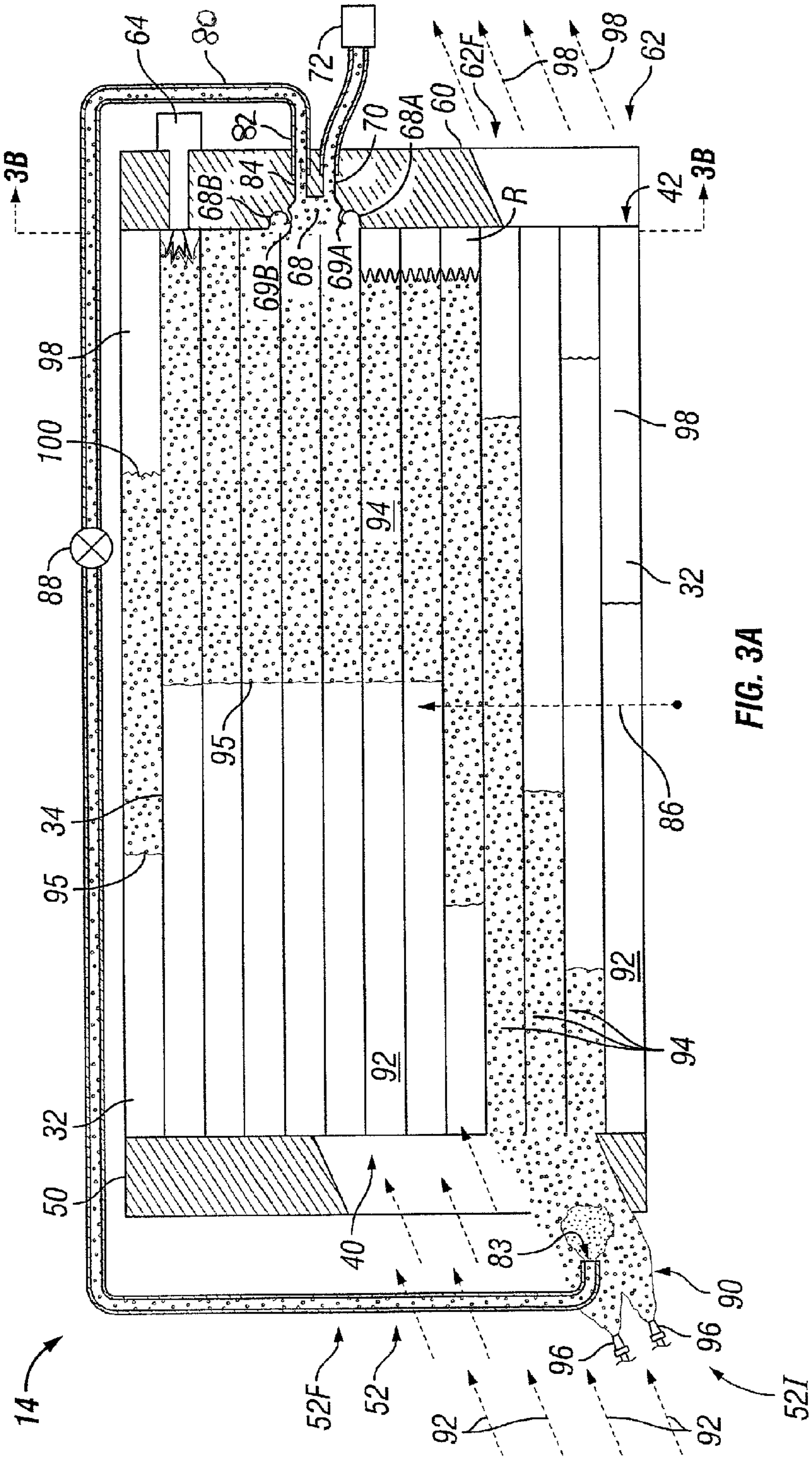
FIGS. 3A and 3B schematically depict some aspects of a non-limiting example of a combustion system in accordance with an embodiment of the present invention.
Figure 3B:
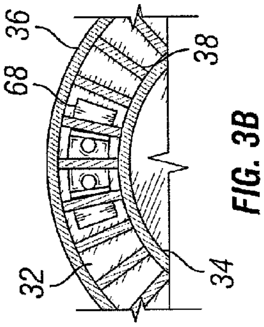

Referring to FIGS. 3A and 3B in conjunction with FIGS. 2A and 2B, end structure 50 is disposed adjacent to open ends 40 of combustion channels 32. In one form, end structure 50 is positioned in close proximity to open ends 40 to seal combustion products and pressure within wave rotor 30. In various embodiments, one or more seal arrangements, e.g., spring loaded carbon seal rings, may be disposed between end structure 50 and wave rotor 30 to seal combustion products and pressure within wave rotor 30, e.g., within combustion channels 32.

In one form, end structure 50 includes an inlet port 52. Inlet port 52 is configured to expose open ends 40 to a fuel and oxidant to permit open ends 40 to receive the fuel and oxidant into combustion channels 32. In one form, the fuel is a hydrocarbon fuel, such as JP-5. In one form, the oxidant is air. In other embodiments, other types of fuels and/or oxidants may be employed.

In the illustrated example, end structure 50 is illustrated in the form of an end plate, which may be referred to as a seal plate. It will be understood that the illustrated geometry is schematic in nature and by way of example only, and that end structure 50 may take any form suitable for sealing disposition with respect to open ends 40 of wave rotor 30. In addition, although only a single port (inlet port 52) that exposes open ends 40 is illustrated, it will be understood that embodiments may include additional ports in end structure 50, e.g., as in a four-port wave rotor system or other wave rotor or rotary valve combustion systems.

End structure 60 is disposed adjacent to open ends 42 of combustion channels 32. In one form, end structure 60 is positioned in close proximity to open ends 42 to seal combustion products and pressure within wave rotor 30. In various embodiments, one or more seal arrangements, e.g., spring loaded carbon seal rings, may be disposed between end structure 60 and wave rotor 30 to seal combustion products and pressure within wave rotor 30, e.g., within combustion channels 32.

End structure 60 includes an exhaust port 62. Exhaust port 62 is configured to discharge combustion products from combustion channels 32. In one form, exhaust port 62 is centered about a different circumferential location than inlet port 52. The phase relationship between inlet port 52 and exhaust port 62 may vary with the needs of the application. In the illustrated example, end structure 60 is illustrated in the form of an end plate, which may be referred to as a seal plate. It will be understood that the illustrated geometry is schematic in nature and by way of example only, and that end structure 60 may take any form suitable for sealing disposition with respect to open ends 42 of wave rotor 30. In addition, although only a single port (exhaust port 62) that exposes open ends 42 is illustrated, it will be understood that embodiments may include additional ports in end structure 60, e.g., as in a four-port wave rotor system or other wave rotor or rotary valve combustion systems.

Disposed in end structure 60 is an ignition source 64. Ignition source 64 is configured to ignite a fuel/oxidant mixture in an adjacent open end 42 of a combustion channel 32. In one form, ignition source 64 is an igniter, such as a spark plug, disposed in an opening in end structure 60. In one form, ignition source 64 is a high energy spark discharge device configured to initiate detonation or deflagration combustion of the fuel/oxidant mixture in the adjacent combustion channel 32. In other embodiments, ignition source 64 may be an igniter configured to initiate deflagration combustion in the adjacent combustion channel 32. In still other embodiments, ignition source 64 may take other forms, including, for example, an opening in end structure 60 for transferring a flame or other combustion process or hot products of combustion that was initiated at another location or transferred from a previous combustion channel 32.

In one form, during normal operation of combustion system 14, end structure 50 and end structure 60 are stationary, whereas wave rotor 30 rotates in a direction 86, sequentially exposing each combustion channel 32 to inlet port 52, and to exhaust port 62. Wave rotor 30 is supported by bearings (not shown). In other embodiments, either or both of end structures 50 and 60 may rotate at the same or different speeds to sequentially expose each combustion channel 32 to inlet port 52, and to exhaust port 62.

In one form, a fuel 90 and an oxidant 92 are received into each combustion channel 32 as a fuel/oxidant mixture 94 when open end 40 of the respective combustion channel passes inlet port 52. In one form, mixture 94 is supplied from an initial portion 52I of inlet port 52, whereas only oxidant 92 is supplied from a final portion 52F of inlet port 52. In one form, oxidant 92 is received from the discharge of compressor system 12. In other embodiments, oxidant 92 may be received from any convenient source, pressurized or not, depending upon the needs of the particular application. In one form, fuel 90 is supplied by one or more injectors 96 that inject fuel 90 into oxidant 92 upstream of inlet port 52. In other embodiments, fuel 90 may be supplied via other arrangements, e.g., via direct injection into combustion channels 32 and/or injection at inlet port 52.

Combustion products 98 from the combustion of mixture 94, e.g., in a previous combustion cycle, are discharged from combustion channels 32 through open ends 42 via exhaust port 62 when open ends 42 of the respective combustion channel passes exhaust port 62. In one form, inlet port 52 and exhaust port 62 are staggered circumferentially such that any given combustion channel 32 will be exposed to exhaust port 62 at open end 42 prior to being exposed to inlet port 52 via open end 40 during rotation of wave rotor in direction 86.

In one form, the combustion process is a constant volume combustion process (or approximately so), resulting in a pressure rise in combustion channel 32. For example, a detonation combustion process is an approximately constant volume combustion process, and hence embodiments employing detonative combustion are considered constant volume combustion systems. In other embodiments, deflagration combustion may also yield a constant volume combustion process, e.g., depending on the configuration of combustion channel 32, the speed of the combustion flame front(s) and whether additional oxidant 92 (without fuel 90) is supplied to combustion channel 32, e.g., subsequent to supplying mixture 94 to combustion channel 32, and the amount of any additional oxidant 92.

Once a combustion channel 32 is exposed to exhaust port 62 via open end 42, the combustion products expand and are ejected through exhaust port 62. With continued rotation of wave rotor 30, the combustion channel is also exposed to an incoming mixture 94 via inlet port 52. In some embodiments, the gas dynamics of the exhausting combustion products 98 assist in pulling in a new charge of mixture 94 into combustion channel 32. With continued rotation of wave rotor 30 in direction 86, the open end 42 of each combustion channel 32 is sequentially closed off as it passes the final portion 62F of exhaust port 62.

In one form, as rotation of wave rotor 30 rotates each combustion channel 32 past initial portion 52I of inlet port 52 and into final portion 52F of inlet port 52, additional oxidant 92 is supplied into combustion channel 32 via open end 40, being drawn into the combustion channel 32 by the continued movement of portions of mixture 94 toward end structure 60. In one embodiment additional oxidant 92 is drawn into combustion channel 32 until the pressure disturbance (caused by the sequential closing off of channel 32 as it passes the final portion 62F of exhaust port 62) arrives at the open end 40. In another embodiment additional oxidant 92 is supplied into combustion channel 32 via open end 40, dynamically pushing mixture 94 toward end structure 60. Reference number 95 represents the interface between mixture 94 and the additional oxidant 92. In various embodiments, the amount of additional oxidant 92 supplied to each combustion channel 32 may vary. In some embodiments, no additional oxidant 92 may be supplied.

Continued rotation of wave rotor 30 rotates each combustion channel past ignition source 64, which ignites mixture 94, advancing a combustion flame front 100 along combustion channel 32 toward open end 40, leaving combustion products 98 in its wake. In some embodiments, the combustion rate results in essentially constant volume combustion. In some embodiments, the expanding combustion products 98 resulting from the constant volume combustion process compress the oxidant 92, wherein oxidant/mixture interface 95 progresses in a flow direction toward open end 40 of combustion channel 32. The combustion process continues in the direction toward open end 40 until mixture 94 is consumed by the combustion process, leaving pressurized oxidant 92 and combustion products 98 remaining in combustion channel 32. In some embodiments, the pressurized oxidant 92 may be extracted for various purposes. Continued rotation of wave rotor 30 eventually exposes each combustion channel 32 to exhaust port 62, where combustion products 98 (and some or substantially all of the additional oxidant 92 in some embodiments) are discharged, e.g., toward turbine 16 in embodiments so equipped. In some embodiments, combustion products 98 may be employed to provide direct thrust.

Under some operating conditions, some remaining additional oxidant 92 (and/or mixture 94 and/or combustion products 98, e.g., depending on the embodiment and on operating parameters and/or other parameters) from a previous combustion cycle may remain in channel 32 in the vicinity of open end 42, identified in FIG. 3A as a remainder R. Also, during the combustion channel 32 filling process, mixing may occur between mixture 94 and oxidizer 92 remaining from the previous cycle. For example, depending on the particulars of various embodiments, mixing may be induced, e.g., due to viscous forces, turbulence induced by features (not shown) in combustion channel 32 (e.g., flame accelerators) for embodiments so equipped, turbulence induced by incidence at open ends 40 and/or 42, motion of the mixtures and gases due to secondary flow patterns set up by combustion channel curvature, pressure gradients within the combustion channels in radial and/or tangential (circumferential) and/or axial directions, e.g., due to centrifugal and centripetal forces and/or by other interactions. The mixing of mixture 94 with oxidant 92, with in some cases some portion of combustion products 98 mixed, forms the remainder R, and the presence of remainder R adversely affects the fuel/oxidant ratio of mixture 94 at open ends 42, which may adversely affect the ignition of mixture 94 by ignition source 64, and may adversely affect the combustion of mixture 94.

Embodiments of the present invention include one or more features to enhance fuel/oxidant ratio of the mixture in combustion channel 32 in the vicinity of open ends 42, e.g., to overcome deficiencies in the fuel/oxidant ratio brought about by mixing with remainder R or due to the presence of remainder R. Some such fuel/oxidant ratio enhancing features are illustrated in FIGS. 3A and 3B. It will be understood that various embodiments may include only one such enhancement feature, or may include any of or all of such enhancement features.

In one form, an enhancement feature in the form of a cavity 68 is employed. Cavity 68 is disposed in end structure 60, and is disposed between exhaust port 62 and ignition source 64, downstream of exhaust port 62 in direction 86 of rotation of wave rotor 30. In one form, a single cavity 68 is employed. In other embodiments, more than one cavity 68 may be employed. Cavity 68 is disposed opposite open ends 42 of combustion channels 32. In one form, cavity 68 is configured with a width that spans a plurality of combustion channels 32, wherein a plurality of combustion channels 32 are exposed to cavity 68 at any one time. In other embodiments, cavity 68 may be configured with a width that is less than that of a single combustion channel 32, or may be configured with a width sufficient to span any number of combustion channels between exhaust port 62 and ignition source 64. In the depiction of FIG. 3A, cavity 68 has a width configured to simultaneously expose at least three combustion channels to cavity 68.

Operation of combustion system 14 includes relative motion between combustion channels 32 and end structures 50 and 60; wherein the relative motion includes open ends 42 of combustion channels 32 moving past exhaust port 62, then past cavity 68, and then past ignition source 64. In one form, cavity 68 is configured, e.g., in size and shape, to promote fluid exchange between cavity 68 and one or more adjacent combustion channels 32 via open ends 42 during the operation of combustion system 14. In other embodiments, cavity 68 may not be configured to promote such fluid exchange.

In one form, cavity 68 is configured to induce turbulence in one or more adjacent combustion channels 32 via open ends 42. For example, in some embodiments, an abrupt entry portion 68A and a smooth exit portion 68B induces turbulence in open ends 42. Embodiments may also include turbulence inducing features, such as turbulators 69A and/or 69B. The shape of cavity 68 and of any turbulators may vary with the needs of the application. Cavity 68 may be shaped to span any desired number of combustion channels 32. Fluid exchange between cavity 68 and combustion channels 32 in open ends 42 tends to equilibrate mixture 94 in the regions of combustion channel 32 adjacent to end structure 60. In addition, achieving a desired level of turbulence in the regions of combustion channel 32, adjacent to end structure 60, helps to promote successful ignition and the resulting rapid combustion of mixture 94.

Another feature for enhancing fuel/oxidant mixture 94 in combustion channel 32 in the vicinity of open ends 42 includes a fuel injection port 70 in fluid communication with a fuel supply 72. Fuel injection port 70 is disposed between exhaust port 62 and ignition source 64, e.g., between final portion 62F of exhaust port 62 and ignition source 64, downstream of exhaust port 62 in direction 86 of rotation of wave rotor 30. In one form, a single fuel injection port 70 is employed. In other embodiments, more than one fuel injection port 70 may be employed. In one form, fuel injection port 70 is in fluid communication with open ends 42 of combustion channels 32 via cavity 68. In other embodiments, fuel injection port 70 may be directly exposed to open ends 42 in addition to or in place of cavity 68. Fuel injection port 70 is operative to supply fuel to open ends 42 of combustion channels 32, e.g., to modify the fuel/oxidant ratio of the gas mixture resulting from remainder R and mixture 94, e.g., mixture 94 diluted with additional oxidant 92 and/or combustion products 98 (e.g., mixture 94 diluted with remainder R). By adding fuel to open ends 42 of combustion channels 32, the desired fuel/oxidant ratio for ignition may be obtained, e.g., within chamber 32 at the aft end 42 (open end 42) as it approaches ignition source 64 due to rotation in direction 86. The modified mixture is subsequently ignited using ignition source 64 during the operation of combustion system 14.

Another feature for enhancing fuel/oxidant mixture 94 in combustion channel 32 in the vicinity of open ends 42 includes a conduit 80 having an opening 82 and an opening 83. Conduit 80 may be formed of one or more components, e.g., tubes, pipes, fittings, and/or cored passages. Opening 82 of conduit 80 is disposed between exhaust port 62 and ignition source 64, downstream of exhaust port 62 in direction 86 of rotation of wave rotor 30. In one form, a single conduit 80 is employed. In other embodiments, more than one conduit 80 may be employed.

Opening 82 is in fluid communication with open ends 42 via an opening 84 in end structure 60. In one form, opening 84 is in fluid communication with open ends 42 of combustion channels 32 via cavity 68. In other embodiments, opening 84 may be directly exposed to open ends 42 in addition to or in place of cavity 68. Conduit 80 is operative to receive fluid from open ends 42 of combustion channel 32, e.g., directly and/or via cavity 68.

In one form, opening 83 of conduit 80 is in fluid communication with open ends 40 of combustion channels 32. In one form, opening 83 is in fluid communication with open ends 40 via inlet port 52. In other embodiments, other schemes may be employed to yield fluid communication between opening 83 of conduit 80 and combustion channels 32, via open ends 40 or via other portions of combustion channels 32. In still other embodiments, opening 83 may be in fluid communication with other features, e.g., with exhaust port 62. In one form, conduit 80 is configured to transmit fluid from open ends 42 of combustion channels 32. In one form, the fluid is transmitted to open ends 40 of combustion channel 32, e.g., via inlet port 52. In other embodiments, the fluid may be transmitted to other locations. In one form, gas dynamics generate higher pressures at open ends 42 in the vicinity of opening 84 than at locations upstream of open ends 40 when exposed to inlet port 52, thereby providing motive force to transmit the contents of combustion channel 32 at open end 42 adjacent to opening 84 toward opening 83 of conduit 80. In other embodiments, other means may be employed to generate flow. In some embodiments, conduit 80 may be configured to transmit fluid, e.g., mixture 94, from upstream of open ends 40 to open ends 42.

By removing fluid from open ends 42 of combustion channels 32, the gas mixture R is replaced with non-diluted mixture 94 that back-fills from portions of combustion channel 32 adjacent to open ends 42. The non-diluted mixture 94 has the desired fuel/oxidant ratio for ignition and combustion, and is drawn into open ends 42 with the removal therefrom of the gas mixture R. The non-diluted mixture is subsequently ignited using ignition source 64 during the operation of combustion system 14. In one form, a valve 88 is coupled to conduit 80 and is operative to control the amount of fluid withdrawn from open ends 42, e.g., directly and/or via cavity 68. In such embodiments, the amount of fluid transmitted toward open ends 40 of combustion channel 32 may be controlled by valve 88 based on the operating conditions of combustion system 14, e.g., power output, inlet conditions, rotational speed of wave rotor 30, etc. In some embodiments, valve 88 may be configured to be closed, thereby preventing fluid transfer from open ends 42, e.g., under selected operating conditions. Still other embodiments may not employ a valve such as valve 88.

In various embodiments, one or more of the aforementioned features may be employed to enhance the fuel/oxidant ratio of the mixture in open ends 42. In some embodiments, each of the aforementioned features may be employed. Some of the features may be activated at some operating conditions and deactivated under other operating conditions. In some embodiments, some features may remain active during all operating conditions.

Embodiments of the present invention include an engine, comprising: a combustion system, including: a plurality of combustion channels, each combustion channel extending between a first open end and a second open end thereof; a first end structure disposed adjacent to the first open ends of the combustion channels, wherein the first end structure includes an inlet port configured to permit the first open ends to receive a fuel and an oxidant into the combustion channels; an ignition source operative to ignite the fuel and the oxidant; and a second end structure disposed adjacent to the second open ends of the combustion channels, wherein the second end structure includes an exhaust port configured to discharge combustion products from the combustion channels; and wherein the second end structure includes a cavity disposed between the exhaust port and the ignition source; wherein operation of the combustion system includes relative motion between the combustion channels and the first and second end structures; and wherein the relative motion includes relative movement between a second open end of a combustion channel and the second end structure, whereby the second open end is exposed to the exhaust port, then the cavity, and then the ignition source.

In a refinement, the engine further comprises a wave rotor, wherein the plurality of combustion channels is disposed in the wave rotor.

In another refinement, the first and second end structures are stationary seal plates.

In yet another refinement, the cavity is sized to promote a gas mixture exchange between the cavity and an adjacent combustion channel via the second open end.

In still another refinement, the cavity has a width configured to simultaneously expose at least three combustion channels to the cavity.

In yet still another refinement, the engine further comprises a conduit in fluid communication with the cavity, wherein the conduit is operative to receive a fluid from the cavity.

In a further refinement, the engine further comprises a valve coupled to the conduit and operative to control an amount of the fluid received from the cavity.

In a yet further refinement, the conduit is also in fluid communication with the inlet port; and the conduit is operative to transmit the received fluid toward the inlet port.

In a still further refinement, the engine further comprises a conduit operative to receive a fluid from a first combustion channel at the second end structure and transmit the fluid to a second combustion channel at the first end structure.

In a yet still further refinement, the engine further comprises a fuel injection port disposed in the second end structure and operative to supply fuel to the second open ends of the combustion channels.

Embodiments of the present invention include a combustion system, comprising: a wave rotor having a plurality of combustion channels, each combustion channel having a first open end and a second open end; an ignition source operative to ignite a fuel and an oxidant; a first end plate positioned adjacent to the first open ends of the combustion channels, wherein the first end plate includes an inlet port for receiving the fuel and the oxidant into the combustion channels; a second end plate adapted to receive the ignition source, wherein the second end plate is positioned adjacent to the second open ends of the combustion channels; wherein the second end plate includes an exhaust port operative to discharge combustion products; and means for enhancing a fuel/oxidant mixture in the combustion channels at the second open end, wherein the means for enhancing is operatively disposed at the second end plate.

In a refinement, the means for enhancing includes means for transmitting a fluid from the second open ends to the inlet port.

In another refinement, the means for transmitting includes a conduit operative to receive a fluid from the second open ends of the combustion channels.

In still another refinement, the combustion system further comprises means for controlling flow of the fluid from the second open ends.

In yet another refinement, the means for enhancing includes a fuel injection port operative to supply fuel to the second open ends.

In yet still another refinement, the means for enhancing includes a cavity operative to exchange fluid with the second open ends of the combustion channels.

Embodiments of the present invention include a combustion system, comprising: a wave rotor having a plurality of combustion channels, each combustion channel having a first open end and a second open end; a first end plate positioned adjacent to the first open ends of the combustion channels, wherein the first end plate includes an inlet port for receiving a fuel and an oxidant into the combustion channels; a second end plate positioned adjacent to the second open ends of the combustion channels; and wherein the second end plate includes an exhaust port operative to discharge combustion products; and a conduit extending between a first opening and a second opening thereof, wherein the first opening is in fluid communication with at least one second open end via the second end plate; wherein the second opening is in fluid communication with at least one first open end via the first end plate; and wherein the conduit is operative to transmit a fluid from the at least one second open end to the at least one first open end.

In a refinement, the first opening of the conduit is disposed between the exhaust port and the ignition source, downstream of the exhaust port in a direction of rotation of the wave rotor.

In another refinement, the second end plate includes a cavity in fluid communication between the first opening of the conduit and the at least one second open end.

In yet another refinement, the cavity is configured to induce turbulence in the combustion channels adjacent the second open ends.

In still another refinement, the combustion system further comprises a turbulator disposed in said cavity and operative to induce turbulence in the at least one second open end.

In yet still another refinement, the combustion system further comprises a valve operative to control a flow of the fluid through the conduit.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An engine, comprising:

a combustion system, including:

a plurality of combustion channels, each combustion channel extending between a first open end and a second open end thereof;

a first end structure disposed adjacent to the first open ends of the combustion channels, wherein the first end structure includes an inlet port configured to permit the first open ends to receive a fuel and an oxidant into the combustion channels;

an ignition source operative to ignite the fuel and the oxidant to form combustion products;

a second end structure disposed adjacent to the second open ends of the combustion channels, wherein the second end structure includes an exhaust port configured to discharge the combustion products from the combustion channels; wherein the second end structure is adapted to receive the ignition source; wherein the second end structure includes a cavity formed therein and disposed between the exhaust port and the ignition source, the second end structure being further formed to include a pair of turbulators that flank the cavity and the cavity is arranged to receive residual combustion products only from the second open ends of the combustion channels, the second end structure further including an open face that opens into the cavity, and the open face has a width that simultaneously exposes at least three combustion channels to the cavity at an interface with the plurality of combustion channels, wherein the cavity is structured to enhance a fuel/oxidant mixture at the second open ends; and a conduit extending between a first opening and a second opening thereof, the first opening of the conduit being in fluid communication with at least one second open end of the combustion channels via the cavity in the second end structure, the second opening being in fluid communication with at least one first open end of the combustion channels via the first end structure, and the conduit being operative to transmit the residual combustion products from the at least one second open end to the at least one first open end of the combustion channels, and wherein the combustion channels and the first and second end structures are configured such that operation of the combustion system includes relative motion between the combustion channels and the first and second end structures; and wherein the combustion channels, the first and second end structures, the exhaust port, the cavity, and the ignition source are configured relative to one another, such that the relative motion includes relative movement between one of the second open ends of a corresponding one of the combustion channels and the second end structure, whereby the second open end is exposed to the exhaust port, then the cavity, and then the ignition source.

2. The engine of claim 1, further comprising a wave rotor, wherein the plurality of combustion channels is disposed in the wave rotor.

3. The engine of claim 2, wherein the first and second end structures are stationary seal plates.

4. The engine of claim 1, wherein the cavity is sized to promote mixing of the fuel/oxidant mixture with the residual combustion products from a previous combustion cycle between two of the plurality of combustion channels that are adjacent to one another via the second open ends of the adjacent combustion channels.

5. The engine of claim 1, further comprising a valve coupled to the conduit and operative to control an amount of the residual combustion products received from the cavity.

6. The engine of claim 5, wherein the conduit is also in fluid communication with the inlet port; and wherein the conduit is operative to transmit the received residual combustion products toward the inlet port.

7. The engine of claim 6, wherein the valve is configured to control the amount of residual combustion products that is transmitted toward the inlet port based on at least one of a power output, inlet conditions, and a rotational speed of the combustion system.

8. The engine of claim 1, further comprising a fuel injection port disposed in the second end structure and operative to supply fuel to the second open ends of the combustion channels.

* * * * *